United States Patent Office  2,899,860
Patented Aug. 18, 1959

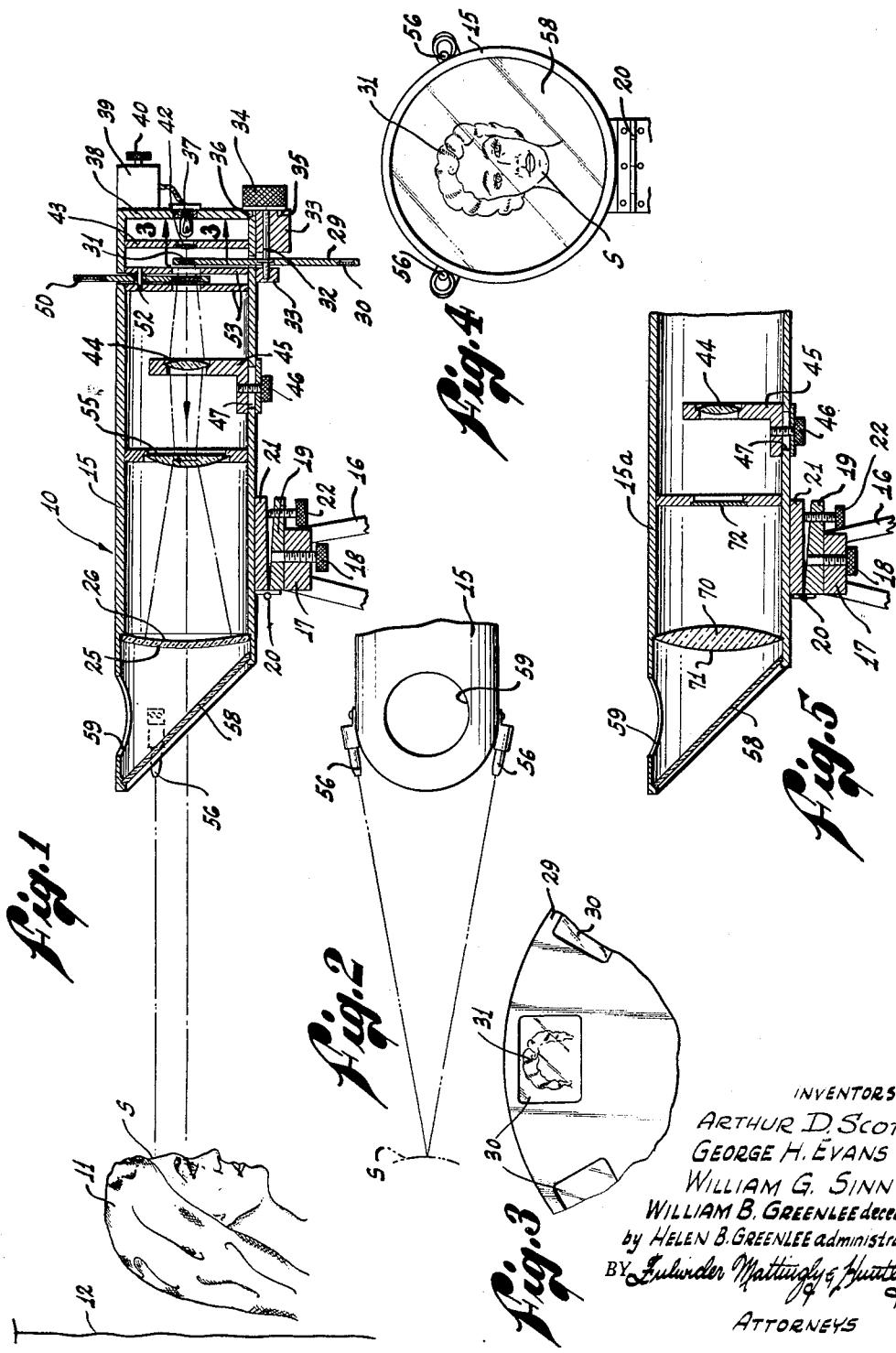

2,899,860

FASHION PREVIEWING PROJECTOR

Arthur D. Scott, Los Angeles, Calif., William B. Greenlee, deceased, late of Downey, Calif., by Helen B. Greenlee, administratrix, Downey, Calif., George H. Evans, Los Angeles, and William G. Sinn, Beverly Hills, Calif.; said administratrix and said Evans assignors of one-twelfth to said Scott and one-twelfth to said Sinn Application August 30, 1955, Serial No. 531,405

7 Claims. (Cl. 88—24)

This invention relates generally to a self-viewing optical device for combining the image of a person with an image or representation of an article adapted to be worn or applied by the person, and more particularly to an improved device of this character which creates a highly realistic illusion.

An embodiment of the invention finds advantageous application in the field of hair styling for previewing the appearance of various coiffures in advance of their creation upon the subject, and will be described herein in reference thereto. It is to be understood, however, that the use of the device is not so limited.

In the creation of the desired illusion it is highly desirable if the subject can be posed in front of a suitable mirror-like optical element and observe directly in said element the combined image of her or himself and the substituted physical characteristic or article of adornment. It is also desirable if the optical elements are concealed from the subject so that only the viewing element is directly observable and attention attracting.

With the foregoing in mind, it is a major object of the invention to provide a device of the character described in which a partially reflective, partially transmissive optical element is used to produce a virtual reflected image of the subject, and to permit viewing of a back positioned fashion image situated in the apparent zone of the virtual image.

An equally important object is to provide in combination with the partially reflective element means for illuminating the fashion image in proper light balance so that the reflected virtual image and the transmitted fashion image are simultaneously observable by the subject and apparently combined.

It is another object of the invention to provide a convex partially mirror-coated optical element within the device for forming a reduced virtual image which permits a compaction of the device and the use of a smaller scale representation of the fashion.

A further object of the invention is to provide in one form of the invention a double convex lens mirror-coated on its front surface to perform the function of a convex mirror and at the same time acts as a magnifying lens for enlarging the image of the fashion.

Another object of the invention is to provide means for projecting a pictorial image onto a diffusion screen or a field lens in the apparent zone of the virtual image for producing a combined subject and pictorial image.

It is also an object of the invention to provide color filter and slide holder means in a device of the character described which permits the economical viewing of a selection of different pictorial images in varying color shades.

A still further object of the invention is to provide means for adjusting the relative size of a projected pictorial image for bringing it into proper scale relationship with a virtual subject image.

These and other objects and advantages of the invention will become apparent from the following detailed description of a preferred and modified form thereof and from an inspection of the accompanying drawings in which:

Figure 1 is a diagrammatic view of the apparatus and a subject posed in self-viewing position;

Figure 2 is a diagrammatic plan view showing the range finding and positioning means for properly locating the subject;

Figure 3 is a cross sectional detail of the slide holder taken along the line 3—3 of Figure 1;

Figure 4 is a front view of the apparatus illustrating the combined observable image; and Figure 5 is a longitudinal medial section of a modified form of the apparatus.

Referring now to the drawings and particularly to Figure 1 thereof, a subject S is shown posed in front of one embodiment of the apparatus designated generally by the numeral 10. As will be described herein, the function of apparatus 10 is to produce a combined image of the subject and a selected hairstyle or coiffure as it would appear on herself. By previewing several different coiffures the subject is enabled to select the one which is the most attractive. It is to be understood that this use of the device is merely illustrative, and that many other uses may be made.

In order to block out or eliminate from view the real hair of the subject S, she places over her head a cloth or turban 11 which covers her hair but permits full view of her face. It is also desirable to provide a black backdrop or screen 12 which separates from view any reflective background which may be present. So posed, light rays from the face of the subject S are directed towards the front of apparatus 10 for the purpose of forming a subject image as will later be described.

The apparatus 10 includes a generally horizontal housing 15 which may be of elongated tubular form and in which are mounted various optical elements for creating the desired illusion. Housing 15 may be supported on a lower tripod 16 which is provided with an upper base flange 17. To permit azimuthal orientation of housing 15 it is rotatably connected to base flange 17 by means of a screw 18 which extends upwardly through the flange and engages within a plate 19 which is in turn connected to the housing. After housing 15 is correctly oriented it may be locked to the tripod by tightening screw 18. It is also desirable that housing 15 be capable of some elevation or depression from the horizontal, and to this end, a hinge 20 connects plate 19 to a similar upper plate 21 which is rigidly secured to the bottom of housing 15. Extending upwardly through plate 19 and bearing against plate 21 is an adjustment screw 22 which may be advanced or retracted to elevate or depress housing 15 from the horizontal.

Mounted at the front of housing 15 in a vertical plane is an optical element 25 which is in the form of a meniscus lens having both inner and outer convex surfaces. The radius of curvature of both inner and outer surfaces are the same in this form of the device. One surface of lens 25, which may be either the inner or outer surface, is coated with a reflective mirror coating 26, the inner surface being so illustrated herein. This mirror coating 26 is of the partially reflective and partially light transmitting type, such coatings being known in the art, and may be formed by a sputtering process wherein the coating is very thin and interspersed with open areas permitting the direct transmission of light. It is possible to form such mirror coatings with different percentage ratios of light transmission and reflection, and in the present instance it is desirable to form a coating which is in the median range insofar as these ratios are concerned.

Considering the coated lens 25 as a convex mirror it will be appreciated that it has the characteristic of forming a reduced virtual image of a subject or object positioned in front of it. The use of a reduced virtual image in this kind of device is desirable in that it permits a compaction of the device and the use of a smaller scale pictorial image of the coiffure. Such a virtual image will appear to lie in a plane behind the mirror on the opposite side to the observer, and will be in an erect position. If the subject is three-dimensional, as is the subject's face, the virtual image formed of it will lie in an apparent zone behind the mirror made up of the different planes necessary to produce the depth of the image. Since the image is virtual it is not actually created in the apparent zone or plane and the space which it appears to occupy is in fact vacant.

Considering lens 25 as a light transmitting window, it will be appreciated that it permits observation of an object or image which is in fact positioned on the opposite side of the lens to the observer, and thus permits observation of an image which occupies the space apparently occupied by the virtual image of the subject. However, in order to permit simultaneous observation of both the reflected image and a transmitted image it is necessary that the light on both images be balanced in accordance with the light reflecting and transmitting characteristics of the mirror-coated lens 25. In other words, if a considerable light unbalance exists, the lens 25 will become either totally reflective or totally transmissive and only one image will be observable. This phenomenon is made use of in the so-called "one way" windows for indirect observation posts.

In the present forms of the invention, it is found desirable to make use of a pictorial representation of a coiffure rather than actual hair in the form of a wig. This effects a substantial economy in operation, and allows a rapid interchange of coiffures in the apparatus so that the subject may see herself in a wide variety of styles. While we will therefore refer to the coiffures as being pictorial images or representations, it is to be understood that the use of the invention is not so limited.

As is best seen in Figure 3, a turret type of circular slide holder 29 carries a plurality of circumferentially spaced transparent slide members 30, each of which has on it a pictorial image 31 of a different coiffure. The images 31 may be in the form of a photographic image or a suitably printed line drawing. These images are considerably smaller in size than an actual coiffure and may be done in black and white rather than in more expensive color tones. The slide holder 29 is mounted near the rear end of housing 15 on a horizontal shaft 32 which is rotatably supported in brackets 33 affixed to the bottom of the housing and is also free for limited sliding movement. Slides 30 are so positioned that the uppermost slide will lie on the optical axis of the device which is extended centrally along housing 15. The rear end of shaft 32 is connected to an indexing knob 34 which carries an indexing pawl or detent 35 adapted to fit into any one of a plurality of circumferentially spaced openings 36 formed in the back end of the rear bracket 33. Openings 36 are spaced in accordance with the spacing of slides 30 on holder 29 so that any one of the slides may be brought into alignment with the optical axis by placing detent 35 in a selected opening. Holder 29 is, of course, held against rotation at this time so that the selected pictorial image 31 cannot shift its position.

As can be understood, it would be possible to directly observe image 31 through lines 25 if the image were properly illuminated. However, in order to utilize a smaller image and to permit adjustment of its size and relative position, it is preferred to utilize projection means for forming a projected image of the pictorial image 31. As will be explained, the projected image is brought forwardly in housing 15 and suitably intercepted so as to be formed in the apparent zone or plane of the virtual subject image.

The projection means include a lamp 37 which is mounted on a rear wall 38 that closes the back of housing 15. Lamp 37 is controlled by a rheostat 39 having a control knob 40 so that the intensity of the lamp can be varied as desired. Mounted in front of lamp 37 and directly behind slide 31 is a condenser lens 42 which is positioned in the center of a baffle 43. High intensity light is thus directed through slide 31 to project forwardly therefrom light rays of the pictorial image 32. A typical positive projector lens or lens systems 44 is positioned in front of slide 31 and completes the projector means. Lens 44 is mounted on a holder 45 and is movable slidably along the optical axis by movement of the holder. A locking screw 46 extends through a slot 47 in housing 15 and is used to lock holder 45 in the desired position.

Longitudinal movement of projector lens 44 has the effect of changing the focus and size of the projected image. The ability to change the size of the projected image is highly important in a device of this kind for it is necessary to adjust the image of the coiffure in accordance with the head size of the individual subject. In other words, the projected image of the coiffure is made to fit the virtual subject image which is observed, by movement of holder 45 and lens 44.

As was previously mentioned, the slide images 32 are economically formed in black and white lines. At the same time it may be desirable to view the coiffure images in color tones corresponding to natural hair colors. For this reason, a color wheel 50 having a plurality of spaced different color filters 51 thereon may be mounted in housing 15 in front of slide holder 30. Color wheel 50 is supported for rotation on a shaft 52 mounted in baffler 53 and can be rotated as desired to modify the projected image with different color tones.

In order to intercept the projected pictorial image sent forwardly through lens 44 a positive field lens 55 is mounted in housing 15 in this form of the apparatus. Lens 55 will form an image of the coiffure which is observable through mirror 25 of the subject. By making the optical constants of the device in proper proportion the projected image formed by field lens 55 can be made to appear in the apparent zone of the reduced virtual subject image formed by mirror 25. Both the virtual image of the subject and the projected image of the coiffure are simultaneously observable by the subject under proper light balance conditions. As was previously mentioned, the intensity of lamp 37 is adjustable through rheostat 38 and the light balance is properly adjusted so that the intensity of the observable virtual image and the projected image are substantially the same. The images of the subject's face and the coiffure will appear to be combined in the manner illustrated in Figure 4, and the subject is thus able to see herself as she would appear in any one of a variety of different coiffures, and in different hair tones.

To position the subject at the proper distance in front of the apparatus it may be desirable to employ a range finding device whereby the actual distance to the face of the subject can be ascertained. As is best seen in Figure 2, a pair of needle beam projectors 56 are mounted on the sides of housing 15 in spaced relationship and so aligned as to project converging beams forwardly towards the subject. Each projector 56 throws a small spot of light on the face of the subject and if the subject is positioned at the point of convergence of the beams, these spots will merge into one. The convergence point of the beams is located with respect to the housing so as to provide the proper subject distance, and thus enable rapid and accurate positioning of the subject by an attending operator.

It may also be desirable to provide a viewing screen in which an operator can view the composite image while standing close to the apparatus in a position to operate the various controls. For this purpose, the front of housing 15 is extended forwardly beyond mirror 25 and a plate of transparent glass 58 is positioned therein at an angle with the vertical so as to act as a beam splitting means. A viewing aperture 59 is formed in the top of the housing projection and a reflected image of the subject and pictorial image as seen by the subject will also be observable to the operator through aperture 59.

In Figure 5 a modified form of the invention is partially illustrated. This device utilizes a double convex lens 70 in the front of a housing 15a which is the same in its rear portion as the previously described housing and contains the same slide, color filter means, and projecting means as the preferred device. Lens 70 is partially mirror-coated on its front convex surface at 71 and this coating acts as a convex mirror to produce a reduced virtual subject image. However, lens 70 also acts as a magnifying lens and permits a reduction in the length of housing 15a and in the image size of the pictorial image, since the projected pictorial image will be magnified when viewed by the subject.

In this form of the invention, a diffusion screen such as a ground glass plate 72 is mounted in place of the field lens and is used to intercept the projected image rays from the projection means, and form a real image. This form of intercepting means may be somewhat more economical than that used in the preferred form, and less critical in optical adjustment, but is subject to more light loss. In all other respects, the modified form of the invention may be the same as the preferred form and the subject will again observe a combined image of herself and the selected coiffure.

While we have thus described in some detail, preferred and modified forms of the invention it is to be understood that modification of design and construction can be made without departing from the scope of the invention. Therefore, we do not wish to be restricted except as defined in the appended claims.

We claim:

1. Apparatus for self-viewing of an optical image of a subject combined with a pictorial image which includes: a housing; a partially reflecting convex mirror mounted at the front of said housing for producing a reduced virtual image of a subject positioned in front of said housing, said virtual image being apparently located in a zone within said housing; a transparent member having a pictorial image theeon positioned within said housing; means for projecting said pictorial image along the optical axis of said mirror; means for intercepting the light rays from said pictorial image and forming a projected image in the zone of said virtual image; means in said projecting means for adjusting the size of said projected image to scale said projected image to said virtual image; color filter means between said projecting means and said intercepting means for color shading said projected image; and means for illuminating said projected pictorial image with light balanced in accordance with the incident light upon said subject and the light transmitting and reflecting characteristics of said mirror whereby said virtual image and said pictorial image are simultaneously observable by said subject and apparently combined.

2. Apparatus for self-viewing of an optical image of a subject combined with a pictorial image which includes: a partially reflecting mirror mounted at the front of said housing for producing a virtual image of a subject positioned in front of said housing, said virtual image being apparently located in a zone within said housing; a pair of beam projectors mounted on the front of said housing and directed inwardly to intersect at a predetermined point for aligning said subject correctly in front of said mirror; a transparent member having a pictorial image thereon positioned within said housing; means for projecting said pictorial image along the optical axis of said mirror; means for intercepting the light rays from said pictorial image and forming a projected image in the zone of said virtual image; and means for illuminating said projected pictorial image with light balanced in accordance with the incident light upon said subject and the light transmitting and reflecting characteristics of said mirror whereby said virtual image and said pictorial image are simultaneously observable by said subject and apparently combined.

3. Apparatus for self-viewing of an optical image of a subject combined with a pictorial image which includes: a housing; a meniscus lens mounted at the front of said housing and having a partial mirror coating on one face thereof for producing a reduced virtual image of a subject positioned in front of said housing, said virtual image being apparently located in a zone within said housing; a transparent member having a pictorial image thereon positioned within said housing; means for projecting said pictorial image along the optical axis of said mirror; a field lens for intercepting the light rays from said pictorial image and forming a projected image in the zone of said virtual image; and means for illuminating said projected pictorial image with sufficient light so that the virtual image reflected by said mirror coating and the projected image transmitted through said lens are of substantially equal intensity and simultaneously observable by said subject.

4. Apparatus for self-viewing of an optical image of a subject combined with a pictorial image which includes: a housing; a positive double convex lens mounted at the front of said housing and having a partial mirror coating on the front face thereof for producing a reduced virtual image of a subject positioned in front of said housing, said virtual image being apparently located in a zone within said housing; a transparent member having a pictorial image thereon positioned within said housing; means for projecting said pictorial image along the optical axis of said mirror; a diffusion screen mounted in said housing at the zone of said virtual image for intercepting the light rays from said pictorial image and forming a projected image, said projected image being of a size to be scaled to said virtual image when observed through said lens; and means for illuminating said projected pictorial image with sufficient light so that the virtual image reflected by said mirror coating and the projected image transmitted through said lens are of substantially equal intensity and simultaneously observable by said subject.

5. Apparatus for self-viewing of an optical image of a subject combined with a pictorial image which includes: a housing; a meniscus lens mounted at the front of said housing and having a partial mirror coating on one face thereof for producing a reduced virtual image of a subject positioned in front of said housing, said virtual image being apparently located in a zone within said housing; a transparent member having a pictorial image thereon positioned within said housing means for projecting said pictorial image along the optical axis of said mirror; a field lens for intercepting the light rays from said pictorial image and forming a projected image in the zone of said virtual image; means in said projecting means for adjusting the size of said projected image to scale said projected image to said virtual image; color filter means between said projecting means and said field lens for color shading said projected image; and means for illuminating said projected pictorial image with sufficient light so that the virtual image reflected by said mirror coating and the projected image transmitted through said lens are of substantially equal intensity and simultaneously observable by said subject.

6. Apparatus for self-viewing of an optical image of a subject combined with a pictorial image which includes: a housing; a partially reflecting mirror mounted at the front of said housing for producing a virtual image of a subject positioned in front of said housing, said virtual image being apparently located in a zone within said housing; a transparent member having a pictorial image thereon positioned within said housing; means for projecting said pictorial image along the optical axis of said mirror; a diffusion screen mounted in said housing at the zone of said virtual image for intercepting the light rays from said pictorial image and forming a projected image; means in said projecting means for adjusting the size of said projected image; color filter means between said projecting means and said diffusion screen for color shading said projected image; and means for illuminating said projected pictorial image with sufficient light so that the virtual image reflected by said mirror coating and the projected image transmitted through said lens are of substantially equal intensity and simultaneously observable by said subject.

7. Apparatus for previewing the appearance of various coiffures on a particular person which includes: a housing; a convex optical element having a partially reflecting mirror coating on one face thereof mounted at the front of said housing for producing a reduced virtual image of the facial outline of a subject positioned in front of said said housing, said virtual image being apparently located in a zone within said housing; a member having a pictorial image of a coiffure thereon positioned within said housing; means for projecting said pictorial image; means for intercepting the light rays from said pictorial image and forming a projected image in the zone of said virtual image; means in said projecting means for adjusting the size of said projected image to scale said projected image to said virtual image; and means for illuminating said projected pictorial image with light balanced in accordance with the incident light upon said subject and the light transmitting and reflecting characteristics of said mirror whereby said virtual image of said facial outline and said pictorial image of said coiffure are brought into registry and are simultaneously observable by said subject.

References Cited in the file of this patent
UNITED STATES PATENTS

| | | |
|---|---|---|
| 2,061,378 | Henze et al. | Nov. 17, 1936 |
| 2,071,338 | Henze et al. | Feb. 23, 1937 |
| 2,075,198 | Henze et al. | Mar. 30, 1937 |
| 2,105,557 | Slack | Jan. 18, 1938 |
| 2,293,271 | Von Knauf | Aug. 18, 1942 |
| 2,297,844 | Shoemaker | Oct. 6, 1942 |
| 2,494,000 | Robertson | Jan. 10, 1950 |
| 2,545,675 | Scott | Mar. 20, 1951 |